United States Patent [19]

Noto et al.

[11] Patent Number: 4,500,820

[45] Date of Patent: Feb. 19, 1985

[54] PROTECTIVE CONTROL APPARATUS FOR ELECTRICAL VEHICLE

[75] Inventors: Yasuo Noto; Shotaro Naito, both of Katsuta; Tsutomu Ohmae, Hitachi, all of Japan

[73] Assignee: Hitachi, Ltd., Tokyo, Japan

[21] Appl. No.: 318,109

[22] Filed: Nov. 4, 1981

[30] Foreign Application Priority Data

Nov. 6, 1980 [JP] Japan .................... 55-155206

[51] Int. Cl.³ .................................. H02P 5/06
[52] U.S. Cl. .................................. 318/139; 318/317;
318/342; 318/345 R; 318/551
[58] Field of Search ............... 318/139, 317, 315, 329,
318/341, 342, 345 R, 345 E, 551

[56] References Cited

U.S. PATENT DOCUMENTS

| 4,090,115 | 5/1978 | Franz, Jr. ................ 318/139 X |
| 4,095,153 | 6/1978 | Matty et al. ................ 318/376 |
| 4,151,450 | 4/1979 | Fukuma et al. ................ 318/317 |
| 4,188,569 | 2/1980 | Campbell ................ 318/139 X |
| 4,216,417 | 8/1980 | Anderson et al. ................ 318/345 E X |
| 4,282,465 | 8/1981 | Acker et al. ................ 318/139 |
| 4,355,342 | 10/1982 | Framzolini ................ 318/341 X |
| 4,366,420 | 12/1982 | Omae et al. ................ 318/139 X |

Primary Examiner—J. V. Truhe
Assistant Examiner—Bentsu Ro
Attorney, Agent, or Firm—Antonelli, Terry & Wands

[57] ABSTRACT

A control apparatus for electric vehicles by using a chopper circuit which turns on or off a d-c drive motor responsive to the instruction of a microcomputer.

The control apparatus of the present invention is characterized by the provision of a protection device. The protection device comprises means for generating a predetermined signal, means for adding the predetermined signal to a signal which varies depending upon the stepped-in amount of the accelerator pedal, means for comparing the added signal with an output signal of a current detector which detects a current that flows into the d-c drive motor, and means which sets the microcomputer when the output signal of the current detector is greater than the added signal and which permits the microcomputer to start again its operation after a predetermined period of time has passed.

5 Claims, 16 Drawing Figures

PROTECTIVE CONTROL APPARATUS FOR ELECTRICAL VEHICLE

BACKGROUND OF THE INVENTION

The present invention relates to a control apparatus that will be used for electric vehicles, such as electric cars, and more specifically to a control apparatus having a microcomputer that can be preferably used for electric cars.

The electric car of this type consists of a d-c power supply, such as a storage battery, a d-c drive motor for driving the car, a chopper circuit for periodically applying a voltage from the d-c power supply to the motor responsive to the amount by which the accelerator pedal is depressed, and a microcomputer for controlling the operation of the chopper circuit.

A control apparatus for electric cars has been disclosed in U.S. Pat. No. 4,095,153 entitled "Transit Vehicle Electrical Brake Control Appartus And Method".

Thus, with the control apparatus employing a microcomputer, a problem arises as to how the electric motor should be protected in case the microcomputer has erroneously operated.

SUMMARY OF THE INVENTION

The object of the present invention is to provide a control apparatus for electric vehicles, which is capable of readily protecting a d-c electric motor for driving the vehicle in case the microcomputer has erroneously operated.

Another object of the present invention is to provide a control apparatus for electric vehicles, which is capable of reducing the time required for interupting the supply of electric current to the d-c drive motor of electric vehicle after erroneous operation has been developed in the microcomputer.

A further object of the present invention is to provide a control apparatus for electric vehicles, which is capable of reducing the time required for restoring the electric vehicle to the properly controlled condition after erroneous operation has been developed in the microcomputer.

Still a further object of the present invention is to provide a control apparatus for electric vehicles, which is capable of quickly detecting erroneous operation of the microcomputer before the chopper circuit develops commutation failure, and which is capable of reducing the time required for restoring the electric vehicle to the properly controlled condition.

In order to accomplish the above-mentioned objects, the present invention deals with a control apparatus comprising means for generating a predetermined signal, means for adding the predetermined signal to a signal which varies in response to the amount by which the accelerator pedal is depressed, means for comparing the added signal with an output signal of a current detector which detects the current that flows into a d-c drive motor, and means which resets the microcomputer when the output signal of the current detector becomes greater than the added signal and which permits the microcomputer to start again its operation after a predetermined period of time has passed, wherein when the current flowing into the motor becomes greater, by more than a predetermined value, than the current which corresponds to the amount by which the accelerator pedal is depressed, the microcomputer is reset to the initial condition, so that the vehicle is restored to the ordinarily controlled condition.

The above-mentioned setup of the present invention makes it possible to prevent the flow of excess current into the electric motor even when the microcomputer has erroneously operated.

DESCRIPTION OF THE PREFERRED EMBODIMENT

Figure 1:
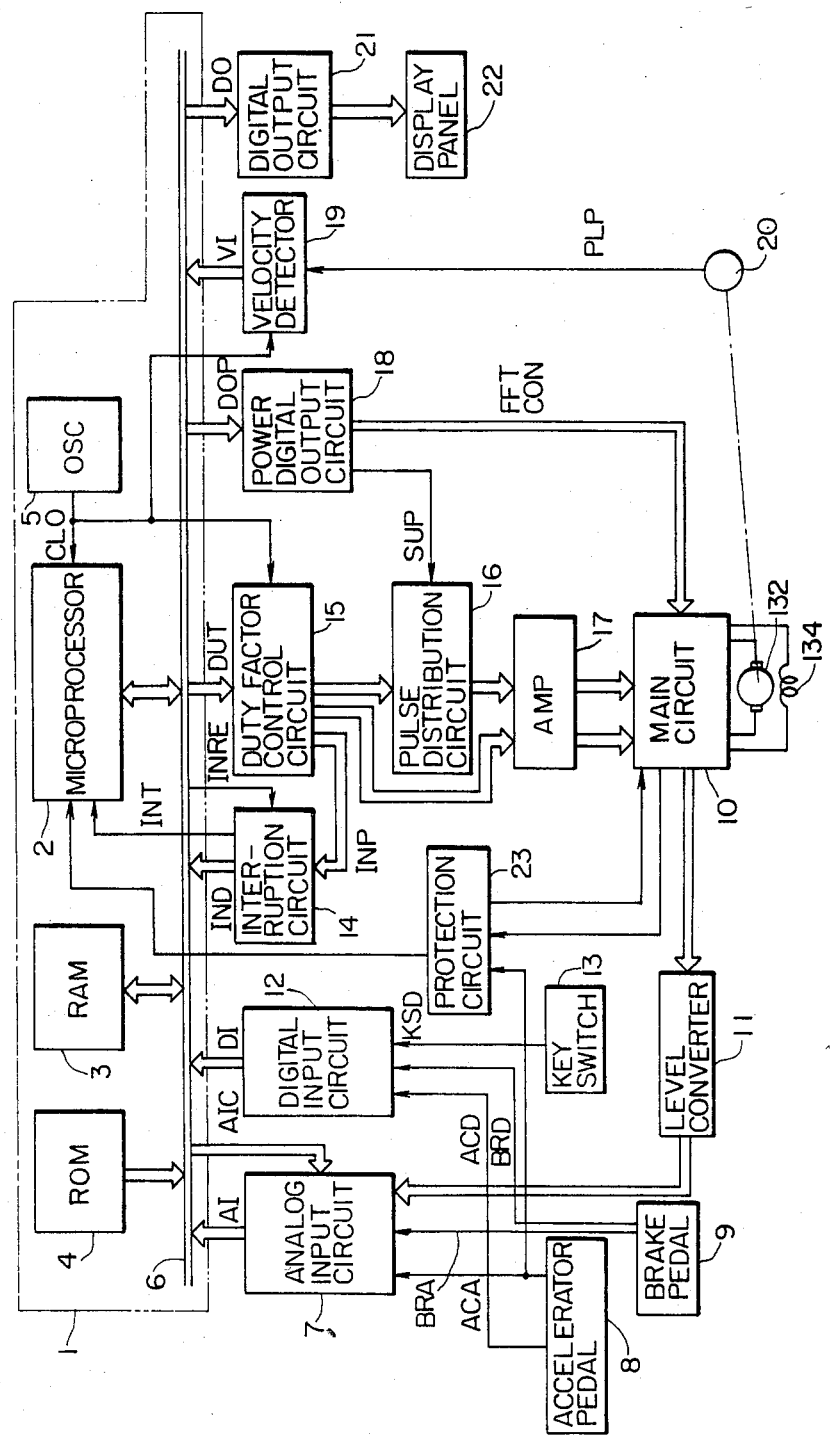
FIG. 1 is a block diagram of a control apparatus for electric cars according to an embodiment of the present invention.

FIG. 1 is a diagram of a fundamental setup of a control apparatus for electric vehicles according to an embodiment of the present invention, in which reference numeral 1 denotes a microcomputer which consists of a microprocessor 2, a random access memory 3, a read-only memory 4, an oscillator 5, and a bus line 6.

Figure 2:
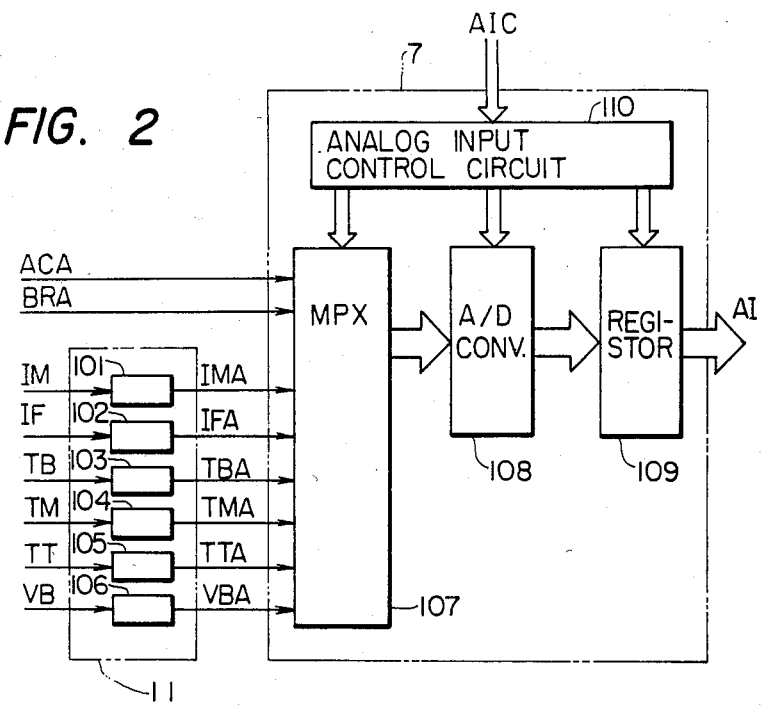
FIG. 2 is a block diagram of an analog input control circuit of FIG. 1 according to the embodiment of the present invention.

Reference numeral 7 denotes an analog input circuit which receives analog electric signals ACA, BRA that vary in response to the amounts by which an accelerator device 8 and a brake device 9 are actuated, and which further receives a plurality of analog signals that are obtained from operation detection signals of a main circuit 10 through a level converter circuit 11. A specific example of the analog input circuit 7 is shown in FIG. 2.

The level converter circuit 11 consists of six circuits, i.e., consists of an amplifier 101 which amplifies the output IM of an armature current detector, an amplifier 102 which amplifies the output IF of a field current detector, an amplifier 103 which amplifies the output TB of a battery temperature detector, an amplifier 104 which amplifies the output TM of a motor temperature detector, an amplifier 105 which amplifies the output TT of a detector which detects the temperature of major thyristors constituting the main circuit, and a voltage-dividing circuit 106 which lowers the battery voltage VB.

The analog input circuit 7 consists of an analog multiplexer 107, an A/D converter 108, a register 109, and an analog input control circuit 110. If a signal is fed from the microprocessor 2 to the analog input circuit 7 of FIG. 2, the analog input control circuit 110 therein so operates the multiplexer 107 that the analog input specified by the applied signal from microprocessor 2 is connected to the A/D converter 108. At the same time, the A/D converter 108 is energized to convert a specified analog quantity into a digital quantity which will be stored in the register 109. Therefore, the microprocessor 2 reads the value of AI to introduce the specified analog quantity.

Figure 3:
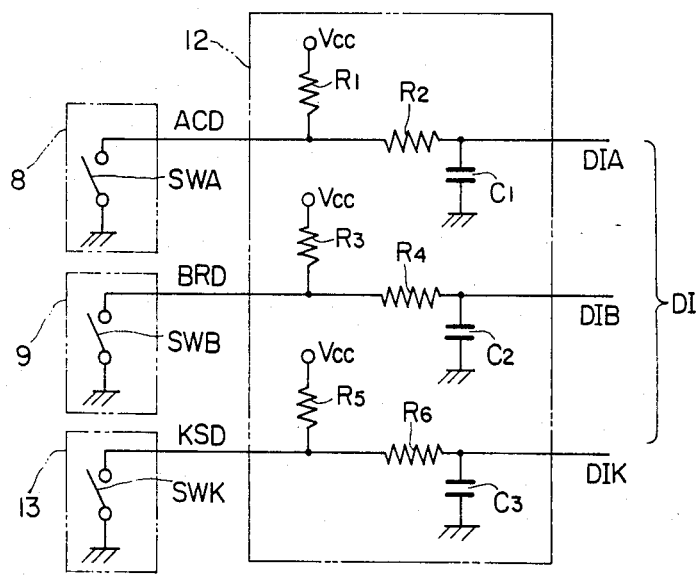
FIG. 3 is a circuit diagram of a digital input circuit of FIG. 1 according to the embodiment of the present invention.

Reference numeral 12 denotes a digital input circuit which receives an accelerator switch signal ACD of one bit which is produced by the accelerator device 8 and which indicates that the accelerator pedal is actuated, a brake switch signal BRD of one bit which is produced by the brake device 9 and which indicates that the brake pedal is actuated, and a signal KSD produced by a key switch 13. These signals are converted through the circuit of FIG. 3 and are fed to the microcomputer. That is, the digital input circuit 12 consists of resistors $R_1$, $R_3$ and $R_5$ connected to the power supply $V_{CC}$ of the microcomputer 1, and resistors $R_2$, $R_4$, $R_6$ and capacitors $C_1$, $C_2$, $C_3$ that constitute a primary delay filter. When the accelerator switch SWA is opened, the power supply voltage $V_{CC}$ is produced on DIA. When the accelerator switch SWA is closed, level zero is produced on DIA. The filter consisting of $R_2$ and $C_1$ works to prevent noise. Similarly, when the brake switch SWB and the key switch SWK are operated, a level one or a level zero is produced on DIB, DIK in response to these operations.

Figure 4:
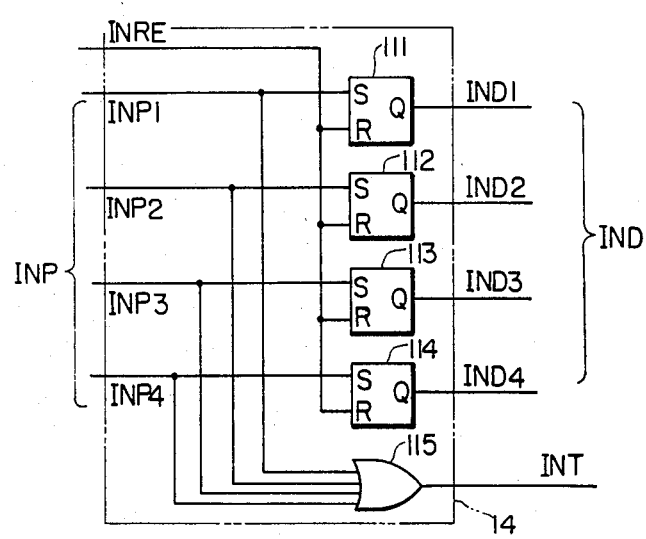
FIG. 4 is a circuit diagram of an interrupt control circuit according to the embodiment of FIG. 1.

The interrupt circuit 14 is constructed as shown in FIG. 4. That is, the interrupt circuit of FIG. 4 receives interrupt pulses INP1 to INP4 of four factors. If a pulse INP1 is produced, the flip-flop circuit 111 is set and assumes the output level IND1. The interrupt pulse INP1 is also fed to an OR circuit 115 to give an interrupt pulse INT to the microprocessor 2. Consequently, the microprocessor 2 receives the content of IND and produces a reset pulse INRE for the flip-flop circuits 111 to 114. The microcomputer discriminates from which one of IND1 to IND4 the input was produced, and executes the interrupt processing. The same holds true even when the interrupt pulse is fed to INP2 to INP4.

In FIG. 1, reference numerals 15 and 16 denote a duty factor control circuit of the armature chopper and a pulse distribution circuit of the field chopper, respectively.

Among the square waves sent from the duty factor control circuit 15, the square wave sent via the pulse distribution circuit 16 is divided into an on pulse and an off pulse of the armature chopper by the pulse distribution circuit 16. The square wave which does not flow through the pulse distribution circuit 16 is divided into an on pulse and off pulse of the field chopper.

Figure 5:
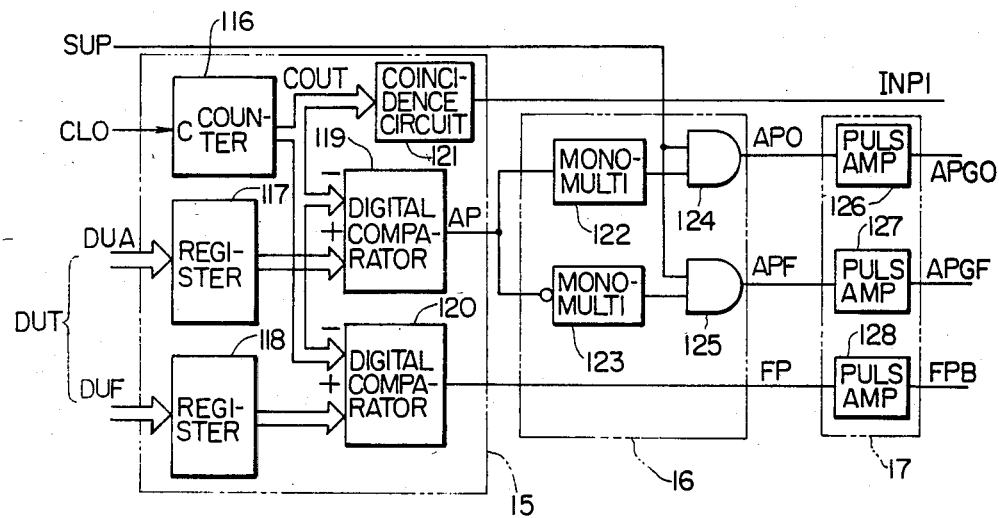
FIG. 5 is a block diagram showing a duty factor control circuit and a pulse distribution circuit of FIG. 1 according to the embodiment of the present invention.
Figure 6:
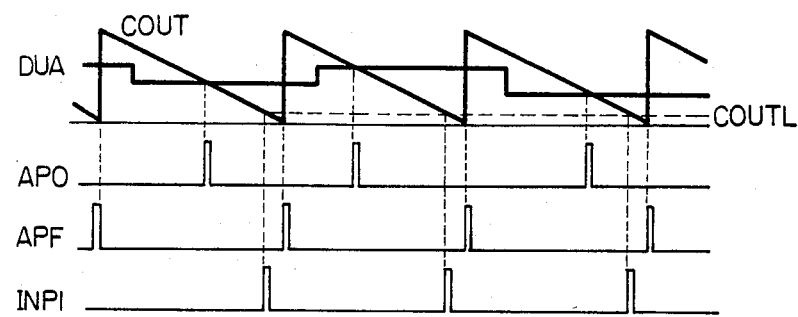
FIG. 6 is a diagram of signal waveforms at each of the portions of the circuit of FIG. 5.

These pulse signals are amplified through an amplifier circuit 17 to control the chopper in the main circuit 10. FIG. 5 illustrates in detail the circuit of this portion. Some of the operation waveforms are shown in FIG. 6. The flow-rate control circuit 15 consists of a counter 116, registers 117, 118, digital comparators 119, 120, and a coincidence circuit 121. The counter 116 counts clock pulses CLO produced by the oscillator 5. The counter 116, however, is a down counter. Consequently, the output COUT of the counter 116 assumes the sawtooth waveform as shown in FIG. 6. In FIG. 5, the output COUT of the counter 116 is compared by digital comparators 119, 120 with values of the registers 117, 118 which are storing a duty factor instruction DUA of the armature chopper and a duty factor instruction DUF of the field chopper, that are given by the microprocessor 2. As the values of the registers 117, 118 become greater than the output COUT of the counter, the digital comparators 119, 120 produce square-wave signals of the level 1. Further, the output COUT of the counter 116 serves as an input to the coincidence circuit 121. As the count value of the counter 116 reaches the value COUTL as shown in FIG. 6, the coincidence circuit 121 produces pulses INP1 of a predetermined width. The pulses INP1 serve as interrupt pulses shown in FIG. 4, to interrupt the microprocessor 2. Further, as the operation waveforms of FIG. 6 teach, the pulse INP1 is produced earlier than the pulse APF by a predetermined period of time. As indicated, the pulse APF is produced at the time the counter 116 is reset.

More particularly, the pulse INP1 is produced in advance of the pulse APF by a predetermined period of time $\Delta T$ (determined by the minimum duty factor of the thyristor chopper circuit 131) which is slightly shorter than the time (usually from 300 $\mu$sec. to 500 $\mu$sec.) from when the on pulse is produced to when the off pulse is produced when the flow rate of the chopper is minimal.

Furthermore, the interrupt pulses INP1 to INP4 serve as inputs to the OR gate circuit 115, and are directly fed as INT to the interrupt terminal of the microprocessor 2.

The example of FIG. 6 uses the interrupt pulse INP1 only. The interrupt pulses INP2 to INP4 of FIG. 4 can be used depending upon the applications although they are not used here. For example, the field current responds slowly compared with the armature current. Therefore, the armature current only may be detected or the commutation failure may also be detected by the interrupt pulse INP1, and the field current may be detected by the interrupt pulse INP2 once every plurality of chopper periods or out of synchronism with the chopper periods. Further, the emergency processing may be carried out by the interrupt pulse INP3 taking precedence over other processings.

The pulse distribution circuit 16 of FIG. 1 has been constructed as shown in FIG. 5. That is, the pulse distribution circuit 16 consists of a monostable circuit 122 which produces pulses of a predetermined width in synchronism with the rise of the square wave produced by the digital comparator 119, a monostable circuit 123 which produces pulses of a predetermined width in synchronism with the break of the square wave, and two AND gate circuits 124, 125. When the microcomputer 1 ceases to produce pulses, the input terminals SUP on one side of the AND gate circuits 124, 125 receive signals at the level 0. If the input terminal SUP assumes the level 1, the outputs of the monostable circuits 122 and 123 are directly produced as outputs of the AND gate circuits 124 and 125 to form signals APO and APF that are shown in FIG. 6. The outputs of the AND gate circuits 124, 125 are amplified through pulse amplifiers 126, 127, and serve, respectively, as a gate pulse APGO for turning on the thyristor chopper that controls the armature current and as a gate pulse APGF for turning off the thyristor chopper that controls the armature current. The square wave produced by the digital comparator 120 is amplified through an amplifier 128, and is used as a base drive signal FPB for a transistor chopper that controls the field current.

Figure 7:
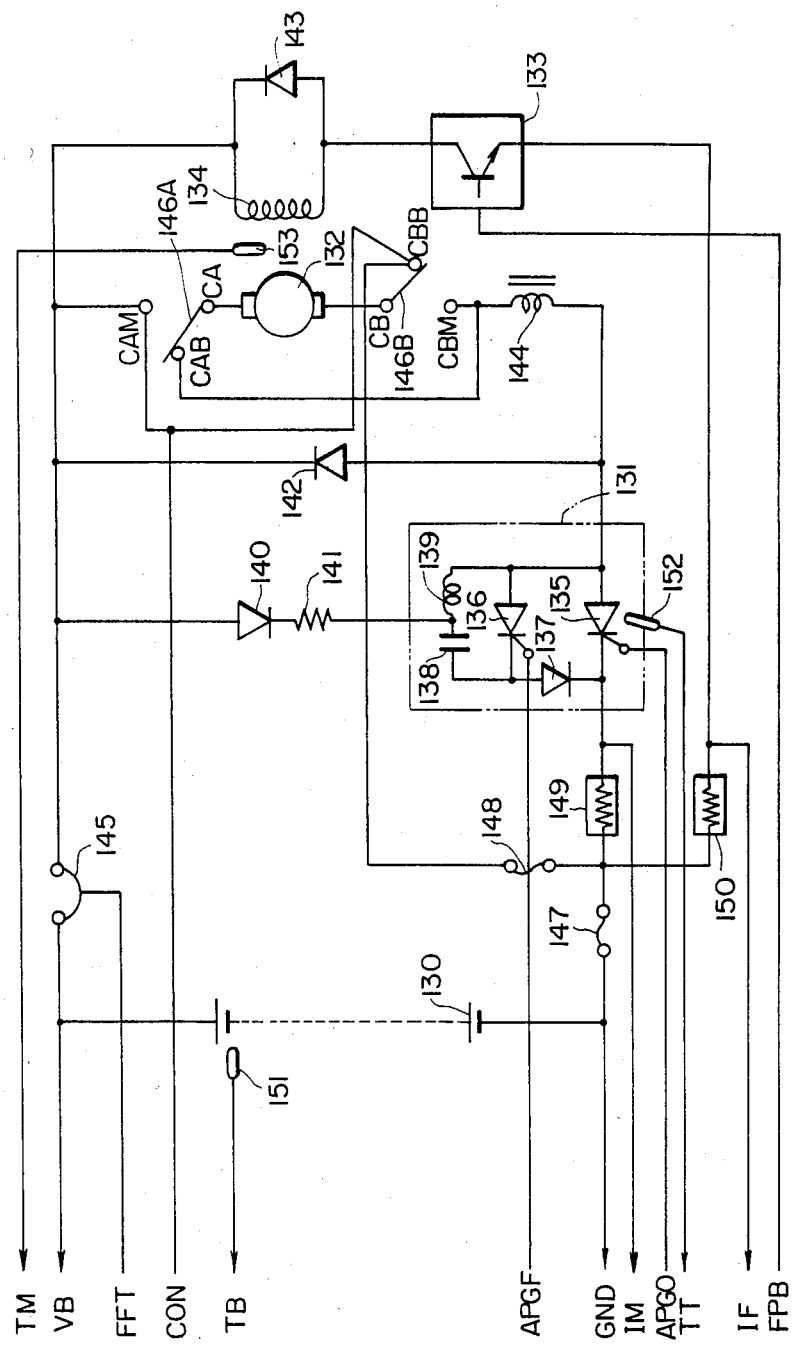
FIG. 7 is a diagram of a main circuit of FIG. 1 according to the embodiment of the present invention.

The main circuit 10 is constructed as shown in FIG. 7. That is, a battery 130 is used as a power supply, the armature current of a shunt motor 132 is controlled by a thyristor chopper circuit 131, and the current flowing into the field winding 134 of the shunt motor 132 is controlled by a transistor chopper circuit 133.

The thyristor chopper circuit 131 consists of a main thyristor 135, an auxiliary thyristor 136, a diode 137, a commutation capacitor 138, and a commutation reactor 139. A diode 140 for auxiliary charging and a resistor 141 have been connected in series to the commutation capacitor 138. Reference numeral 142 denotes a flywheel diode for the shunt motor 132 and for a d-c reactor 144. Reference numeral 143 denotes a fly-wheel diode for the field winding. Reference numeral 145 denotes a switch for breaking the power-supply circuit. The switch 145 is closed by a hand lever installed in the driver's compartment, and is opened by a signal FET. Reference numerals 146A, 146B denote contact points of a contactor 146. The state of FIG. 7 is established when a contactor control signal CON is of the level 0. When the contactor excitation signal CON is of the level 1, the contacts are operated, so that the terminal CA is connected to CAM and the terminal CB is connected to CBM. The contactor 146 effects the switching between the power running and the regenerative braking operation. FIG. 7 shows the regenerative mode in which when the thyristor chopper circuit 131 is turned on, the voltage induced in the shunt motor 132 is short-circuited via the d-c reactor 144 and when the thyristor chopper circuit 131 is turned off after a predetermined period of time has passed, the voltages induced in the shunt motor 132 and induced in the d-c reactor 144 are recovered into the battery 130 via the fly-wheel diode 142. During this period, the field current is controlled by the chopper circuit 133. Thus, the regenerative operation is carried out.

On the other hand, when the contactor excitation signal CON assumes the level 1 to actuate the contactor 146, the terminal CA is connected to CAM and the terminal CB is connected to CBM. If the thyristor chopper circuit 131 is turned on under this condition, the voltage of the battery 130 is applied to the shunt motor 132; therefore, increased current flows through the shunt motor 132. Further, if the thyristor chopper circuit 131 is turned off, the current flowing through the shunt motor 132 is attenuated through the d-c reactor 144 and the fly-wheel diode 142, and the power running is effected.

Reference numerals 147 and 148 denote fuses for protection, and 149, 150 denote, respectively, a shunt resistor for detecting the armature current and a shunt resistor for detecting the field current. The values of armature and field currents are fed to the microcomputers 1 via the amplifiers 101, 102 of FIG. 2. Reference numerals 151, 152 and 153 denote thermistors for detecting the temperatures of battery 130, main thyristor 135 and shunt motor 132; values of temperatures are fed to the microcomputer 1 via the amplifiers 103, 104 and 105 of FIG. 2.

Referring to FIG. 1, reference numeral 18 denotes a power digital output circuit which produces a signal SUP for suppressing the gate pulse of FIG. 5, and excitation signals CON, FET for the contactor 146 and switch 145 of FIG. 7.

Reference numeral 19 denotes a velocity detector which detects, in a digital manner, the velocity relying upon a pulse train PLP produced by a pulse generator 20 which produces pulses at predetermined rotational positions and in proportion to the speed of the shunt motor 132. The detected velocity is fed to the microcomputer 1.

Figure 8:
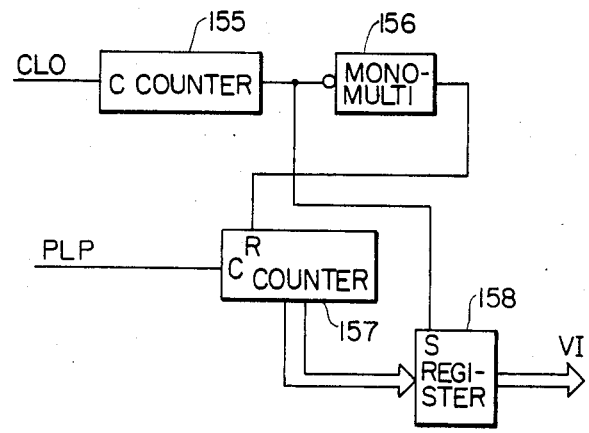
FIG. 8 is a block diagram of a speed detection circuit of FIG. 1 according to the embodiment of the present invention.

FIG. 8 shows a concrete example of the velocity detector circuit 19. Namely, the velocity detector circuit 19 consists of a counter 155 which produces pulses at a time interval that serves as a reference for measuring the velocity, a monostable circuit 156 which produces pulses of a predetermined width in synchronism with the break of overflow pulses of the counter 155, a counter 157 for counting the number of pulses PLP produced by the pulse generator 20, and a register 158 which holds the output of the counter 157 after every predetermined period of time. The counter 157 is reset by the pulse produced by the monostable circuit 156 after every predetermined period of time and, hence, detects the velocity relying upon the number of pulses received within a predetermined period of time, i.e., relying upon the output of the counter. The output of the counter 157 is set into the register 158 by the overflow pulse of the counter 155 just before the reset pulse is received. Upon receipt of the content of the register 158, the microcomputer 1 detects the speed. Here, the counter 155 utilizes reference pulses CLO of the oscillator 5 of FIG. 1 as clock pulses.

Reverting again to FIG. 1, reference numeral 21 denotes a digital output circuit which works to turn on a lamp in a panel 22 located in front of the driver's seat.

The operation of the control apparatus of FIG. 1 is carried out by successively processing the contents of a program stored in the read-only memory 4. The contents of the processing will be described below.

Figure 9A:
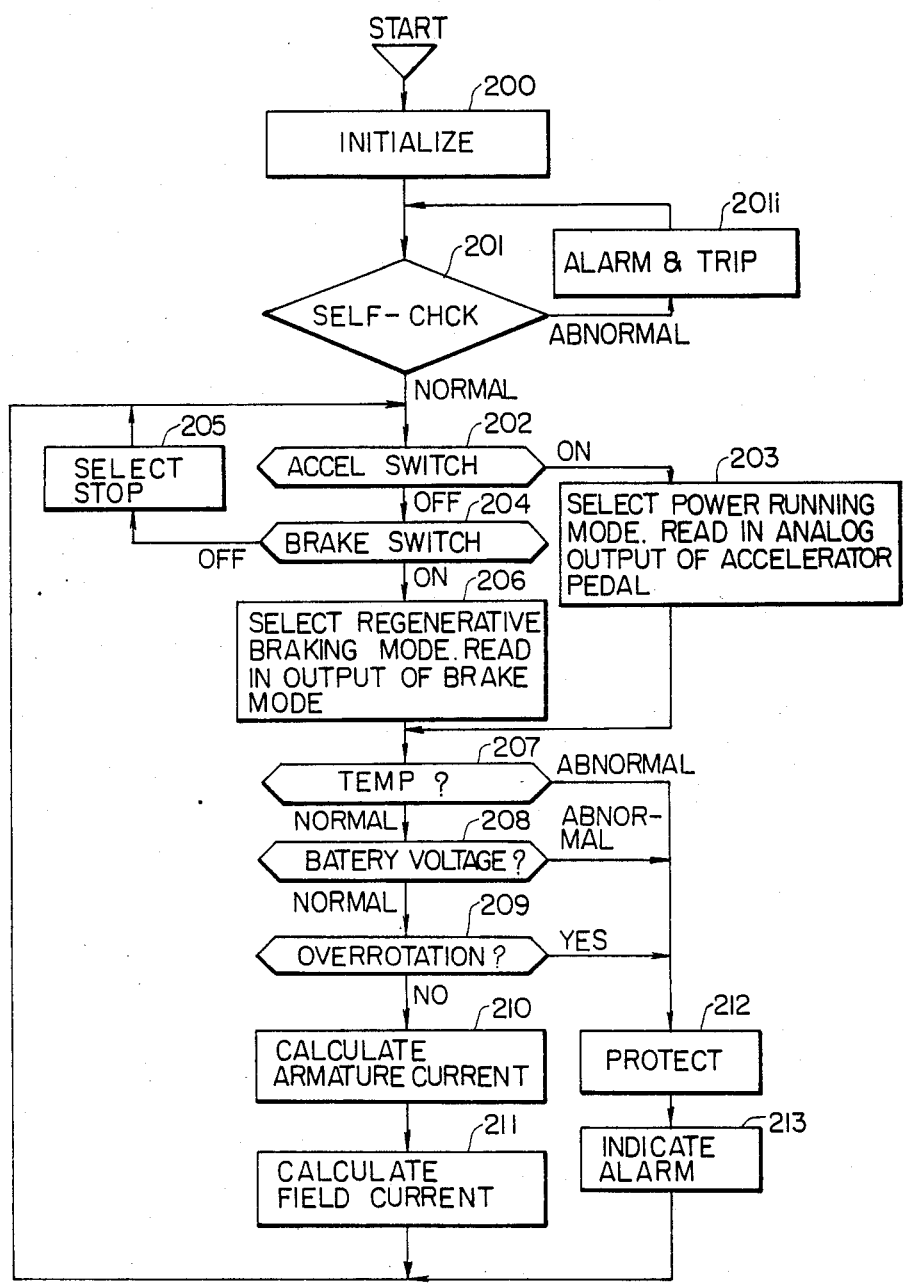
FIG. 9A is a flow chart of a main program that is ordinarily executed.
Figure 9B:
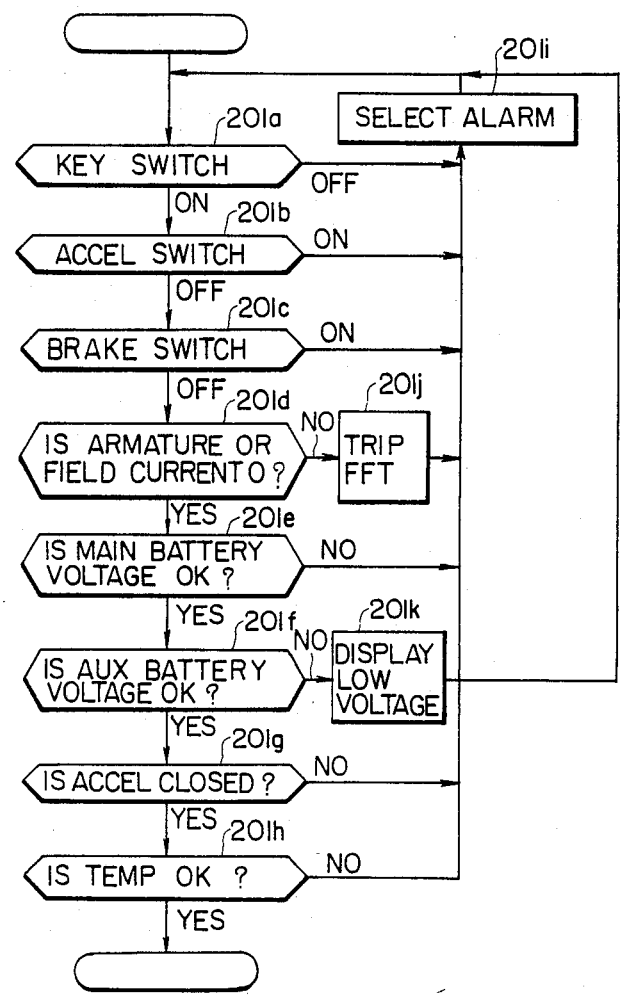
FIG. 9B is a flow chart of a step for diagnosing an abnormal condition in the flow chart of FIG. 9A.
Figure 10:
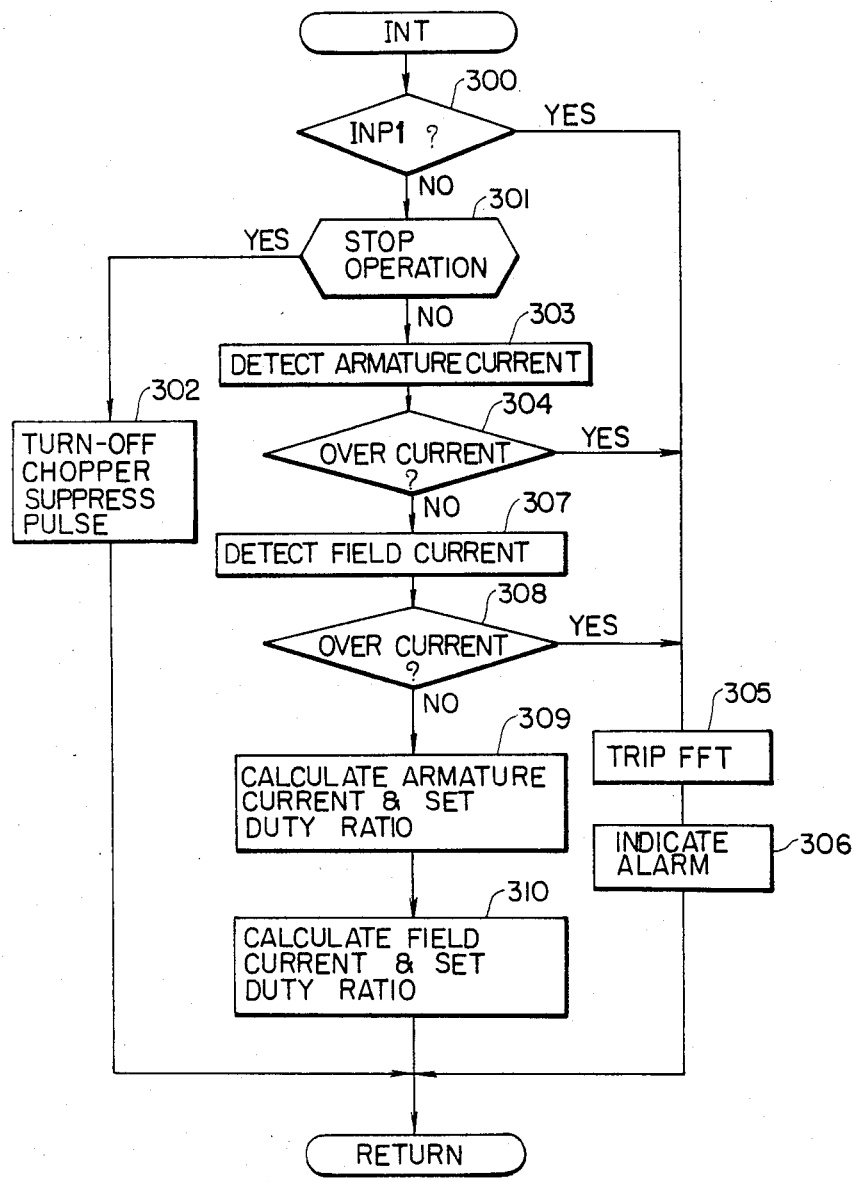
FIG. 10 is a flow chart of an interrupt program.

The program written in the read-only memory 4 of FIG. 1 can be roughly divided into two parts. A first program is the main program which is usually executed, and its contents are shown in FIGS. 9A and 9B. A second program is the interrupt program which is executed by the production of an interrupt pulse, and its processing contents are shown in FIG. 10. The contents of FIGS. 9A, 9B and 10 will be mentioned below in connection with FIG. 1.

As the microcomputer 1 is energized, a step 200 of FIG. 9A executes the processing to set initial values into the registers and the random access memory 3 of FIG. 1. Then, a step 201 introduces digital signals such as key switch signal KSD and accelerator switch signal ACD via the digital input circuit 12, and further introduces analog output ACA of the accelerator device 8 via the analog input circuit 7, to discriminate whether the thus introduced values are normal or abnormal. If the values are abnormal, abnormal display is effected in a step 201i, and the program returns to the step 201 to diagnose abnormal conditions and to display abnormal state. If the diagnosis proves the result to be normal, the program proceeds to a step 202. Diagnosis of abnormal conditions in the step 201 will be explained in detail in conjunction with FIG. 9B.

A step 201a of FIG. 9B checks whether the key switch signal introduced via the digital input circuit is on or off. The signal which is off indicates the occurrence of an abnormal condition. That is, the program is executed when the power supply is connected by turning on the key switch. Therefore, the key switch signal which is off indicates that the input signal is abnormal and, hence, the hardware is defective. Therefore, the program proceeds to a step 201i where the abnormal condition of the controller is displayed. The program then returns to the step 201a to repeat the checking operation and display. The condition is normal when the key switch signal is on in the step 201a and, hence, the program proceeds to the next step 201b. Similarly, a step 201b checks whether the accelerator switch signal is on or off. The accelerator switch signal which is on is abnormal; therefore, an abnormal condition of the controller is displayed under such circumstances in the step 201i. The accelerator switch signal which is off is normal. In this case, a step 201c checks the brake switch signal. Thus, the digital input signals are successively checked and a display is generated if there are any abnormal conditions. When the signals are normal, the program proceeds to check the subsequent signals.

The next step 201d and the subsequent steps check to see whether the values of the analog signals introduced through the analog input circuit 7 are abnormal or not. Namely, the step 201d checks to determine whether the armature current and field current are zero or not. Since the accelerator switch has not been turned on, the current which is not zero is abnormal; therefore, under these circumstances, the program proceeds to a step 201j where a switch trip signal FET shown in FIG. 7 is produced to trip the switch 145. In the flow chart of FIG. 9B, thereafter, the program proceeds to the step 201i to display the abnormal condition. The current of a value of 0 is normal; and so, if such condition is detected the program proceeds to a next step 201e which checks the voltage VB of the main battery 130. A step 201f checks the voltage of the auxiliary battery, a step 201g checks the opening degree of the accelerator, and a step 201h checks the temperature of the motor or the control apparatus. When there are any abnormal conditions, the abnormal condition of controller is displayed. In checking the voltage of the auxiliary battery, the abnormal condition will be further clarified if an abnormal condition in the charging system is separately displayed in a step 201k.

By detecting and diagnosing the digital input signals and the analog input signals prior to operating the vehicle, it becomes possible to prevent the control apparatus from becoming out of control even when abnormal input signals are introduced.

Reverting to FIG. 9A, if the diagnosis in the step 201 proves all of the results to be normal, a step 202 performs its processing. Namely, the step 202 checks the condition of the accelerator switch. When the accelerator pedal is being actuated, a step 203 specifies the mode of power running, and introduces the analog output ACA of the accelerator device 8 via the analog input circuit 7. When the accelerator switch is off, on the other hand, the condition of the brake switch is discriminated by a step 204. When the brake switch is off, a step 205 specifies the stop condition, and the program returns to the step 202. When the brake switch is on, a step 206 specifies the regenerative braking mode, and introduces the analog output BRA of the brake device 9 via the analog input circuit 7. Then, a step 207 introduces the temperatures TM, TT and TB of the motor, main thyristor and battery via the level converter circuit 11 and the analog input circuit 7. When these values are abnormal, the program proceeds to steps 212 and 213 where the protective operation is carried out to reduce the current and an alarm is indicated by a lamp on the panel 22 via the digital output circuit 21.

A step 208 introduces the battery voltage VB via the level converter circuit 11 and the analog input circuit 7. When the battery voltage is too low to continuously operate the electric car, the condition is discriminated to be abnormal, and the protective operation is carried out by the step 212 and the alarm is produced by the step 213. Then, a step 209 introduces the running speed of the motor via the velocity detector circuit 19. When the running speed is abnormally high, it is discriminated to be overrotation, and the protective operation is carried out and the alarm is produced. When the running speed of the motor is not excessive, the steps 210, 211 operate normally to calculate the armature current instruction and the field current instruction relying upon the amount of actuation of the accelerator pedal or the amount of actuation of the brake pedal detected by the steps 202, 204 and, further, relying upon the running speed of the motor; the program then returns to the step 202. The above-mentioned operation is carried out repetitively in the main program.

When the interrupt pulse of FIG. 4 is produced while the main program is being executed, the interrupt program of FIG. 10 is executed. A first step 300 in the interrupt program discriminates whether the interrupt signal INP is being produced or not. When the interrupt instruction INP is being produced, the FFT is tripped by a step 305. When it is confirmed in the step 300 that the interrupt instruction INP has not been produced, a step 301 discriminates whether the stop instruction has been produced or not. When the stop instruction is produced, the program proceeds to a step 302 where the signal SUP fed to the pulse distribution circuit 16 via the power digital output circuit 18 assumes the level 0, and the chopper ceases to produce pulses. When there is no stop instruction, the program proceeds to a step 303 where a value IM of armature current is fed to the microcomputer 1 via the analog input circuit 7. A too great value of IM is abnormal. When such an abnormal condition is detected by the step 304, a step 305 works to open the switch 145 of FIG. 7 via the power digital output circuit 18, so that the application of voltage to the shunt motor 132 is terminated, and the alarm is displayed on the panel 21 by a step 306 via the digital output circuit 20. When the armature current is not excessive, the program proceeds to a step 307 where a value IF of field current is supplied to the microcomputer 1 via the analog input circuit 7. The value IF which is detected to be too great in a step 308 is abnormal. In this case, the program proceeds to steps 305, 306 where the switch 145 is opened, the alarm is produced, the interrupt program is finished, and the program returns to the main program. When the field current is not excessive, the program proceeds to steps 309 and 310 where the practically flowing currents are brought into agreement with the instructed values relying upon the armature current instruction and field current instruction which have been stored in the main program, and relying upon the previously detected armature current IM and the field current IF. The thus obtained duty factor values DUA and DUF are set into the registers 117 and 118 of FIG. 5. Consequently, the duty factor control circuit 15 and the pulse distribution circuit 16 produce a gate pulse and a base-driving square wave for the thyristor chopper circuit 131 and for the transistor chopper circuit 133, responsive to the predetermined duty factor instruction.

These signals are amplified to actuate the thyristor and transistor, whereby the currents flowing into the armature and the field coil of the motor are controlled.

The interrupt program of FIG. 10 is finished when the processing of step 310 is finished, and returns to the main program which is executed under ordinary condition.

Figure 11:
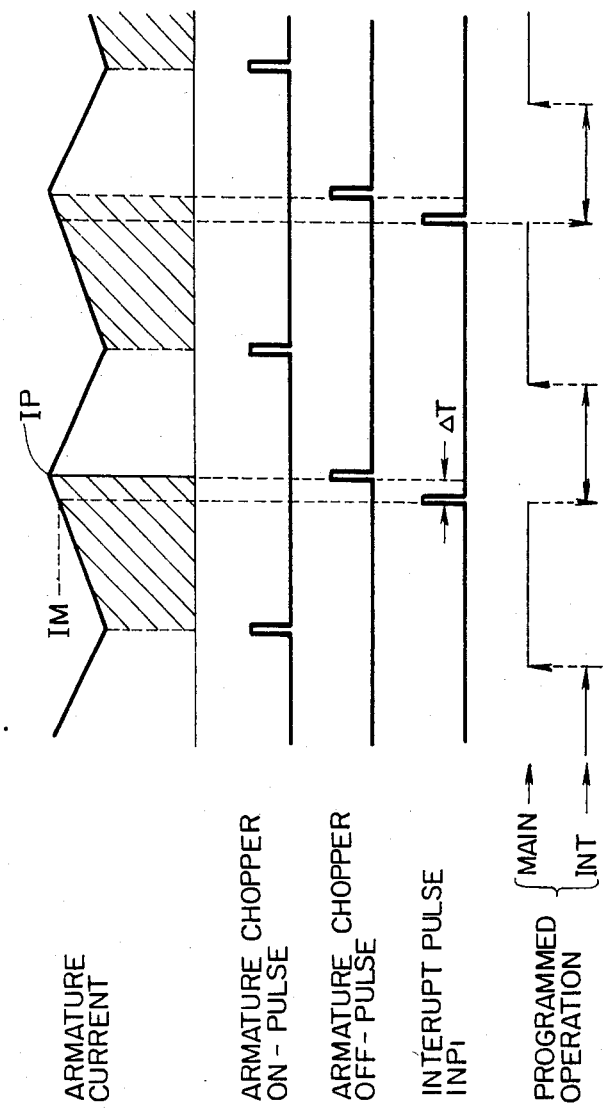
FIG. 11 is a time chart showing starting sequences for the main program and the interrupt program.

FIG. 11 shows examples of starting sequences for these two programs in comparison with the operation of the field chopper. The interrupt pulse INP1 is produced in advance of the off pulse of the armature chopper by a time ΔT, and the interrupt program is started by the interrupt pulse INP1. When the interrupt program is finished after a time of, for example, 2.0 to 2.5 msec. has passed, the program returns to the main program. The value IM close to a peak value IP of armature current is fed to the computer. Here, it is recommended that the time ΔT is slightly longer than two times the current detection time. The commutation failure may be detected in the interrupt processing after the off pulse has been produced.

According to the present invention, the electric motor is controlled by the above-mentioned setup which makes use of a microprocessor. Therefore, the control performance is not affected by the temperature or by the environmental change. Namely, a small control apparatus can be realized maintaining high reliability. Furthermore, the following effects are brought about if the motor is controlled by the interrupt pulse that is produced at a timing of FIG. 11. First, as will be understood from FIG. 11, an electric current is detected just before the chopper is turned off, and the motor is controlled by detecting the peak value in the current. Therefore, there is no probability of commutation failure, and the motor is protected desirably.

The electric cars may be so designed that the response is relatively slow after the accelerator pedal has been actuated. Therefore, the current instruction is calculated once every several chopper periods in the main program. The volume of program processing can be reduced in the interrupt program and the processing time can be shortened. Therefore, the processing can be executed with a microcomputer having a relatively slow processing speed.

Figure 12:
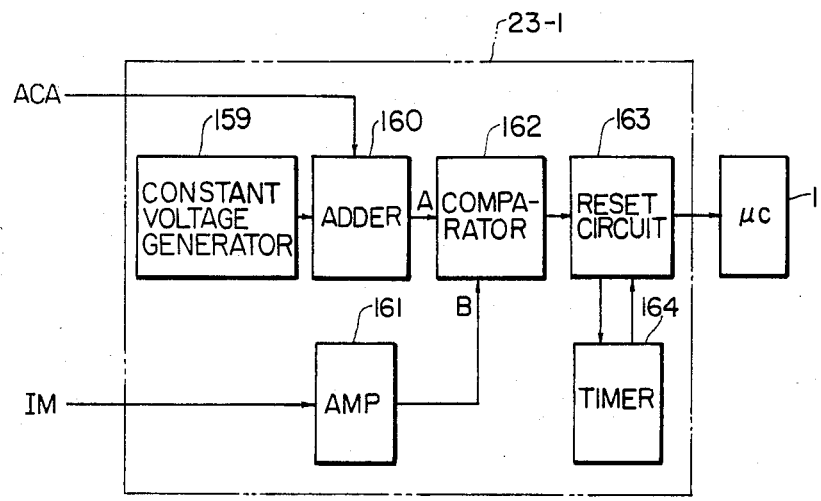
FIG. 12 is a block diagram showing a portion of a protection circuit of FIG. 1.

The control apparatus according to this embodiment is further characterized by the provision of a protection circuit 23. As shown in FIG. 12, the protection circuit 23 consists of a constant voltage generator 159 which generates a constant voltage, an adder 160 which adds the constant voltage to an accelerator signal voltage ACA that varies depending upon the amount of actuation of the accelerator pedal, an amplifier 161 which amplifies the output voltage IM (terminal voltage of the shunt resistor 149 of FIG. 7) of the armature current detector, a comparator 162 which compares the output voltage A of the adder 160 with the output voltage B of the amplifier 161, and which produces an output when the output voltage B is greater than the output voltage A, and a reset circuit 163 which receives the output of the comparator 162 and produces a reset signal to the microcomputer 1. The reset circuit 163 has a timer 164 for measuring the time that is required for resetting the microcomputer 1.

Figure 14:
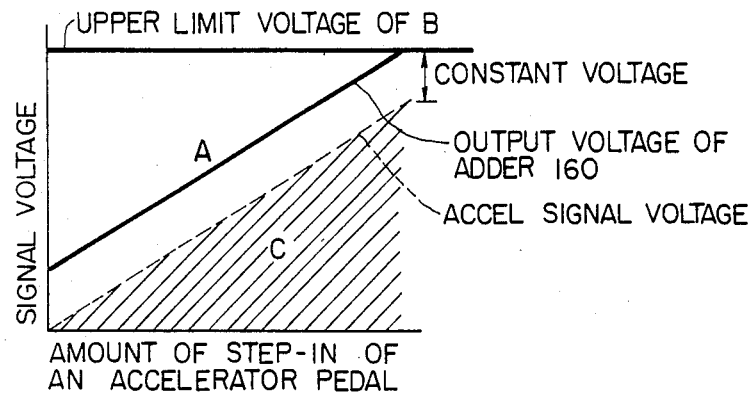
FIG. 14 is a graph showing a relation among the amount of actuation of the accelerator pedal, the accelerator signal voltage, the signal voltage of the armature current, the output voltage from the adder of FIG. 12, and the upper limit voltage of the comparator of FIG. 13.

The accelerator signal voltage ACA changes in proportion to the amount of actuation of the accelerator pedal, as indicated by a broken line in FIG. 14. Under normal conditions, the signal voltage B (amplified through the amplifier 161) of the armature current lies in a hatched region C beneath the broken line. The adder 160 adds the constant voltage to the accelerator signal voltage ACA. The output voltage A of the adder 160 therefore is as indicated by a solid line in FIG. 14. The comparator 162 compares the voltage A indicated by the solid line with the signal voltage B of armature current amplified through the amplifier 161, and discriminates the relation to be abnormal when the voltage B becomes greater than the voltage A, and energizes the reset circuit 163. When the reset circuit 163 is operated, the reset signal is fed to the microcomputer 1, and the timer 164 is actuated. While the timer 164 is operating, the reset circuit 163 continues to produce reset signals; therefore, the microcomputer 1 is reset during this period. When the operation of the time 164 is finished, the reset signals are produced no more, whereby the microcomputer 1 starts to operate, and the program is initiated starting from the step 200 of setting initial values (refer to FIG. 9A).

According to the apparatus of this embodiment as mentioned above, the microcomputer is reset when the armature current becomes greater, by more than a predetermined value, than the current which corresponds to the amount of actuation of the accelerator pedal, the control operations of the chopper and the like are stopped, and the operations are started again from the condition of initial values. Therefore, when the cause of abnormal condition stems from a mere erroneous operation of the microcomputer, the apparatus can be easily returned to the ordinarily controlled condition. When the cause of abnormal condition is so serious as to effect the operation of the car, the apparatus is not returned to the ordinarily controlled state as a matter of course.

Figure 13:
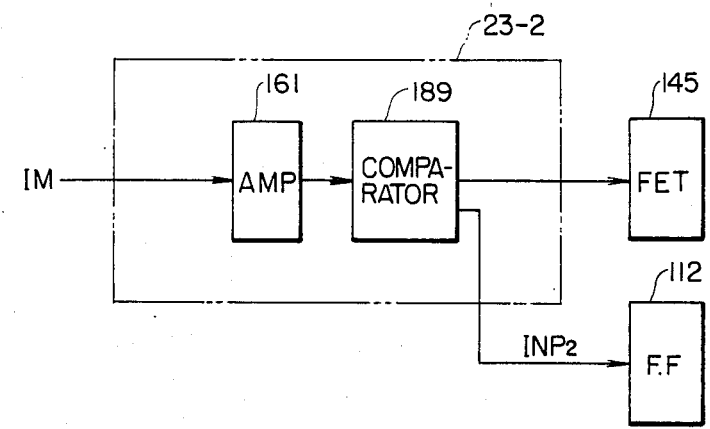
FIG. 13 is a block diagram showing another portion of the protection circuit of FIG. 1.

FIG. 13 is a block diagram of an overcurrent protection circuit 23-2 which is provided for the protection circuit 23, as required. The protection circuit 23-2 consists of an amplifier 161 for amplifying the output voltage IM of the armature current detector, and a comparator 189 which produces an output when the output of the amplifier 161 becomes greater than a predetermined voltage. The output of the comparator 189 causes the FET 145 of FIG. 7 to trip and the flip-flop 112 of FIG. 4 to operate. In FIG. 14, the upper limit voltage of B represents a predetermined voltage which is set from comparator 189.

Figure 15:
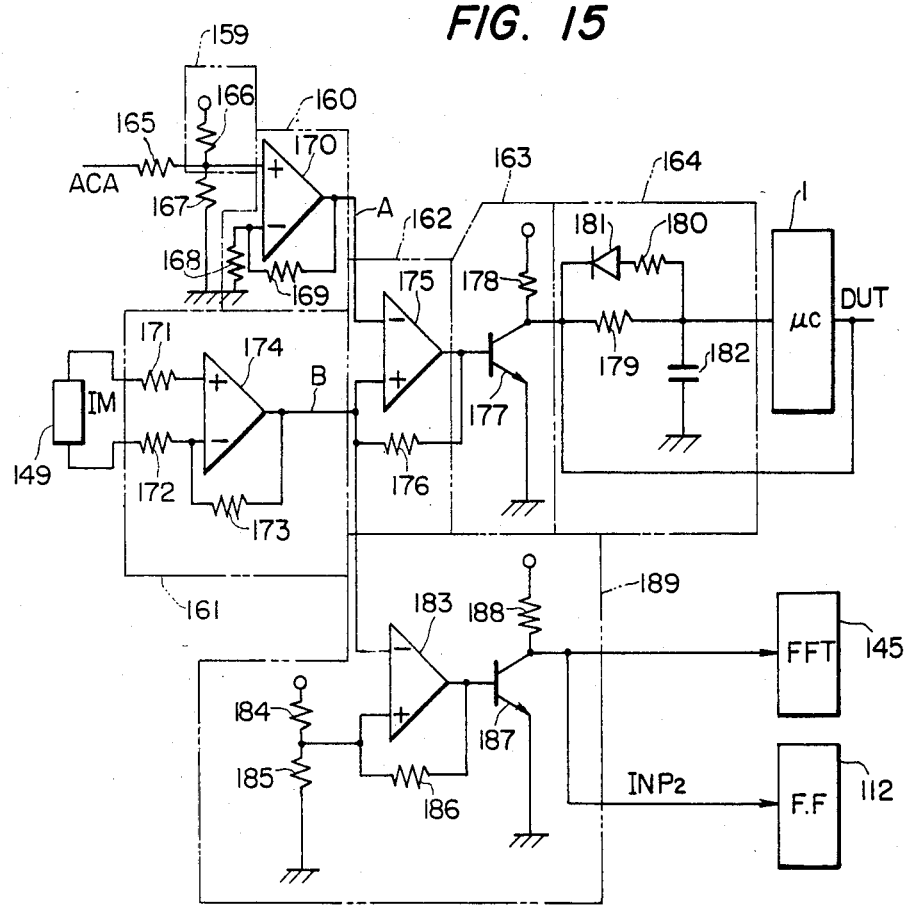
FIG. 15 is a circuit diagram showing details of the block diagrams of FIGS. 12 and 13 according to the embodiment of the present invention.

FIG. 15 shows a more concrete example of the protection circuit 23, in which reference numerals 165 to 169 denote resistors, and 170 denotes an amplifier. A constant voltage determined by the resistors 166, 167 is added to the accelerator signal voltage ACA. Reference numeral 149 denotes the shunt resistor for detecting the armature current that was illustrated with reference to FIG. 7, reference numerals 171 to 173 denotes resistors, and 174 denote an amplifier. These members amplify the signal voltage IM of armature current to a value suited for effecting the comparison. Reference numeral 177 denotes a transistor, 178 to 180 denote resistors, 181 denotes a diode, and 182 denotes a capacitor. These elements constitute a reset circuit and a timer. Reference numeral 1 denotes a microcomputer.

Under the ordinary condition, the transistor 177 is nonconductive, the capacitor 182 assumes the high level, and the microcomputer 1 is in operation. When the armature current, i.e., the output voltage B of the amplifier 174 becomes greater thn the output voltage A of the amplifier 170 which is obtained by adding the predetermined voltage to the accelerator signal, the transistor 177 is rendered conductive, the capacitor 182 assumes the low level, the reset signal of the microcomputer 1 assumes the low level, and the chopper signal DUT assumes the low level. When the chopper signals DUT are produced no more, no current flows into the shunt resistor 149, and the output voltage of the amplifier 174 assumes the low level. Consequently, the transistor 177 is rendered nonconductive, the voltage of the capacitor 182 is raised with a time constant determined by the resistance 179 and the capacitance 182, and the reset signal assumes the high level after a predetermined period of time has passed. In this case, the microcomputer 1 returns to the initial state to set the initial values. If there is no abnormal condition, the control operation is carried out as mentioned above.

In FIG. 15, the amplifier 183 receives the TM signal through its inverting terminal and receives through its non-inverting terminal a constant voltage that is determined by the resistors 184, 185. The transistor 187 is operated by the output from the amplifier 183, and produces an output to FET 145 and FF 112.

The foregoing embodiment has dealt with the case in which the protection circuits 23-1 and 23-2 are made up of analog circuits. The present invention, however, should in no way be limited thereto, but includes the cases in which the protection circuits are made up of digital circuits. Furthermore, the constant voltage generator 159 should not be limited to the one which produces a constant voltage, but may be replaced by a generator which produces an output on which there is superposed a signal that changes depending upon the amount of actuation of the accelerator.

According to the present invention as mentioned in the foregoing, the electric current flowing into the electric motor is monitored with reference to a current that varies depending upon the amount of actuation of the accelerator, and the electric car is controlled by detecting a peak value in the armature current as shown in FIG. 11. Therefore, the erroneous operation of the microcomputer is detected and processed before the commutation failure develops, and the apparatus is quickly returned to the normally controlled state maintaining increased reliability.

What is claimed is:

1. In a control apparatus for electric vehicles comprising a d-c power supply, a d-c motor to be selectively connected to said power supply, a chopper circuit which periodically applies the voltage of said power supply to said motor in response to the amount of actuation of the accelerator pedal, a current detector which detects the current that flows into said motor, a computer for controlling said chopper circuit based upon an instruction signal from said accelerator pedal and a detection current from said current detector, and an interrupt signal generator which generates an interrupt signal for starting said computer in synchronism with the control signal which controls said chopper circuit, the improvement comprising means for generating a predetermined signal, means for adding output signals from said signal generating means to the instruction signal of said accelerator pedal, means for comparing said added signal with a signal that corresponds to the output of said current detector, and means for resetting said computer to stop normal operation of said d-c motor when the signal corresponding to the output of said current detector is greater than said added signal and for initializing said computer a predetermined time after said resetting to start again the normal operation of said d-c motor after said predetermined period of time has passed.

2. A control apparatus for electric vehicles according to claim 1, wherein said predetermined signal produced by said signal generating means consists of a constant voltage.

3. A control apparatus for electric vehicles according to claim 1, further including means for interrupting the supply of current from said power supply to said motor when the instruction signal from said accelerator pedal becomes greater than a predetermined value.

4. A control apparatus for electric vehicles according to claim 1, wherein said computer includes means responsive to an interrupt pulse received from said interrupt signal generator a predetermined period of time earlier than the time at which said chopper circuit is turned off for reading the current value from said current detector and for causing said computer to discontinue the supply of current from said power supply to said motor when the current value read by said computer becomes equal to, or greater than, a current value which has been stored in said computer.

5. A control apparatus for electric vehicles according to claim 3 or 4, wherein a circuit breaker is provided between said power supply and said motor, and said means which operates to interrupt the supply of current to said motor causes said circuit breaker to be turned on or turned off.

* * * * *